United States Patent [19]
Burgin

[11] Patent Number: 6,023,064
[45] Date of Patent: Feb. 8, 2000

[54] OBJECT SENSING SYSTEM

[75] Inventor: Mark Burgin, Salford, United Kingdom

[73] Assignee: U.K. Robotics Limited, Manchester, United Kingdom

[21] Appl. No.: 08/849,962

[22] PCT Filed: Oct. 31, 1995

[86] PCT No.: PCT/GB95/02545

§ 371 Date: Sep. 19, 1997

§ 102(e) Date: Sep. 19, 1997

[87] PCT Pub. No.: WO96/18114

PCT Pub. Date: Jun. 13, 1996

[30] Foreign Application Priority Data

Dec. 8, 1994 [GB] United Kingdom .................... 9424753

[51] Int. Cl.[7] .................................................. G01S 17/93
[52] U.S. Cl. ............................................................. 250/341.8
[58] Field of Search ........................................... 250/341.8

[56] References Cited

U.S. PATENT DOCUMENTS 4,884,216  11/1989  Kuperstein .
4,893,025   1/1990  Lee .

FOREIGN PATENT DOCUMENTS

| 93 07 500 U | 7/1993 | Germany . |
| 93 07 500 U1 | 9/1993 | Germany . |
| 2 131 642 | 6/1984 | United Kingdom . |
| WO A93 07511 | 4/1993 | WIPO . |

OTHER PUBLICATIONS

Cheung, Edward and Lumelsky, Vladimir, J., "Proximity Sensing in Robot Manipulator Motion Planning: System and Implementation Issues", IEEE Transactions on Robotics and Automation, vol. 5, No. 6, Dec. 1989, pp. 740–751.

Primary Examiner—Constantine Hannaher
Attorney, Agent, or Firm—Clifford W. Browning; Woodard, Emhardt, Naughton Moriarty & McNett

[57] ABSTRACT

An object sensing system comprises an array of emitters (3) and detectors (4). The emitters are arranged with overlapping fields of illumination such that each illuminates at least part of a space within which objects are to be sensed. Each detector is positioned to detect radiation reflected from the emitters towards it from any object in the space. The emitters are energized in a sequence such that the space is illuminated by each emitter in turn. The sequential energization of the emitters is correlated with an output of each detector to sense an object and its range within the space.

20 Claims, 3 Drawing Sheets

OBJECT SENSING SYSTEM

The present invention relates to an object sensing system, particularly, but not exclusively, an object sensing system for use in a collision avoidance system of an automated manipulator.

There are a number of known range sensing systems used in a variety of applications. One such application is in collision avoidance systems of automated manipulators such as robot arms. Collision avoidance systems are useful in teleoperated or off-line programmed manipulators to prevent the manipulator colliding with objects in its operating environment.

Range sensing systems for such collision avoidance applications must meet a number of criteria. For instance, the system should ideally cover the entire volume of space surrounding the manipulator. This entails the use of a number of sensor elements which therefore should preferably be small, uncomplicated and cheap. In addition, the operating speed of the sensor system must be sufficiently fast to meet the real-time control requirements of the manipulator control system.

In view of the above requirements infra red (IR) light reflection range sensing systems have been used in such collision avoidance systems. See, for example, the article "Proximity Sensing in Robot Manipulator Motion Planning: System Implementation Issues", IEEE Transactions on Robotics and Automation, Vol. 5 No. 6, December 1989.

Essentially, such IR range sensing systems use an LED (light emitting diode) as a point source of IR light to illuminate any object which enters its field of illumination. IR light reflected from the object is then detected by a suitable detector such as a photo diode. The intensity of the IR light which falls on the object, and thus the intensity of the detected reflected light, is related to the distance between the LED/detector and the object (i.e. the range of the object) in accordance with the inverse square law. The range of the object is thus computed by the sensing system as a function of the known intensity of the emitted light and the measured intensity of the reflected light.

Simple single emitter/detector IR range sensing systems suffer the disadvantage that they are sensitive to the reflection characteristics of the object. That is two different objects at the same range may reflect different amounts of the emitted IR light as a result of a difference in their reflection characteristics. The reflection characteristics of any given object are dependant upon its albedo, its orientation relative to the emitter and detector, its area in the field of illumination, and its area in the field of view of the detector. Thus sensing systems have been proposed which eliminate the dependence on the object reflection characteristics by utilising two emitters (or detectors) spaced apart on the axis of measurement (i.e. a line passing through each emitter (or detector) and the object). This yields two separate measurements for which the reflection characteristics will be identical and which can therefore be combined to give a measurement of the range of the object which is independent of its reflection characteristics.

However, the accuracy of such a system is dependant upon the separation of the two emitters (or detectors). In practice, in order to give acceptable results the separation must be a significant fraction (i.e. more than about 25%) of the maximum range that is to be measured. A typical maximum range requirement of a sensing system in a robot manipulator collision avoidance system is of the order of 500 mm, in which case the emitter (or detector) separation would have to be about 125 mm in order to achieve a desirable level of accuracy. Such known range sensing systems cannot therefore be used in collision avoidance systems without unacceptably interfering with the utility of the manipulator.

It is an object of the present invention to provide a range sensing system which obviates or mitigates the above problems.

According to a first aspect of the present invention there is provided an object sensing system comprising an array of emitters arranged with overlapping fields of illumination such that each illuminates at least part of a space within which objects are to be sensed, at least one detector positioned to detect radiation reflected from the emitters towards it from the space, means for energising the emitters in a sequence such that the space is illuminated by each emitter in turn, and means for correlating the energisation of each of the emitters with an output of the detector to sense an object within the space.

According to a second aspect of the present invention there is provided an object sensing system comprising at least one emitter which illuminates a space within which objects are to be sensed, an array of detectors each positioned to detect radiation reflected from the emitter towards it from the space, and means for correlating the output of the emitter with an output of each detector to sense an object within the space.

By utilising an array of sequentially energised emitters, the respective outputs of which are correlated with outputs of at least one detector (or by utilising an array of detectors the outputs of which are correlated with at least one emitter) it is possible to determine the range of an object in said space independently of its reflection characteristics even if the emitters are radiating light to the object at different angles (or the detectors are detecting light reflected from the object at different angles). This allows the emitter (or detector) array to be given a relatively flat construction, for instance with the emitters and detector arranged on a common plane such that the direction of emission is generally perpendicular to that plane. Such a construction has advantages for applications such as in collision avoidance systems where existing sensors are too bulky.

The correlated emitter/detector data may be processed to yield range information either by using an analytical approach or by using a neural network. Use of a neural network is preferred as an analytical solution is in practice difficult to produce because of the potential complexity and variety of the object characteristics.

In a preferred embodiment, the sensing system includes a microprocessor for processing the correlated data by way of a software implemented neural network to derive range information.

The neural network preferably has separate input nodes for receiving data representative of the or each detector output for detected light reflected from the or each emitter. Preferably the neural network has an additional input for receiving a scaling value so that the maximum of the input values is equated to 1.

The sensing system may include more than one array of emitters each illuminating a different part of said space, each with at least one associated detector, or more than one array of detectors each with at least one associated emitter. In this case, the system preferably comprises a corresponding number of neural networks, each one of which processes data relating to a respective array.

Preferably an array of detectors is associated with an array of emitters. In this case the or each neural network associated with the or each array preferably comprises a number of independent neural networks corresponding to the number of detectors associated in each respective array, each of said independent networks processing the data relating to the outputs of a single detector.

The greater the number of emitters included, and the greater the number of associated detectors, the more data will be available for processing to derive range information.

Preferably the or each array is linear.

The or each emitter may be of any suitable type, such as a light emitting diode, and similarly the detector/detectors may be of any suitable type, such as photo diodes.

The or each emitter is preferably an infra red light emitter.

Preferably the sensing system includes means for modulating the radiation emitted by the or each emitter and means for demodulating the output of the or each detector so that information relating to the detected reflected emitted radiation can be differentiated from that relating to the detected background radiation.

Preferably the sensing system includes means for varying its sensitivity. This is advantageous to take account of the substantial difference in the intensity of radiation which may be reflected from, for example, a relatively close, large highly reflective object as compared with that reflected from a relatively distant, small and less reflective object.

Such sensitivity varying means may for instance comprise a variable gain amplifier through which the or each detector output is passed. If the sensing system includes more than one array of emitters then preferably a separate sensitivity varying means is associated with each respective array.

Specific embodiments of the present invention will now be described, by way of example, with referee to the accompanying drawings, in which.

Figure 1:
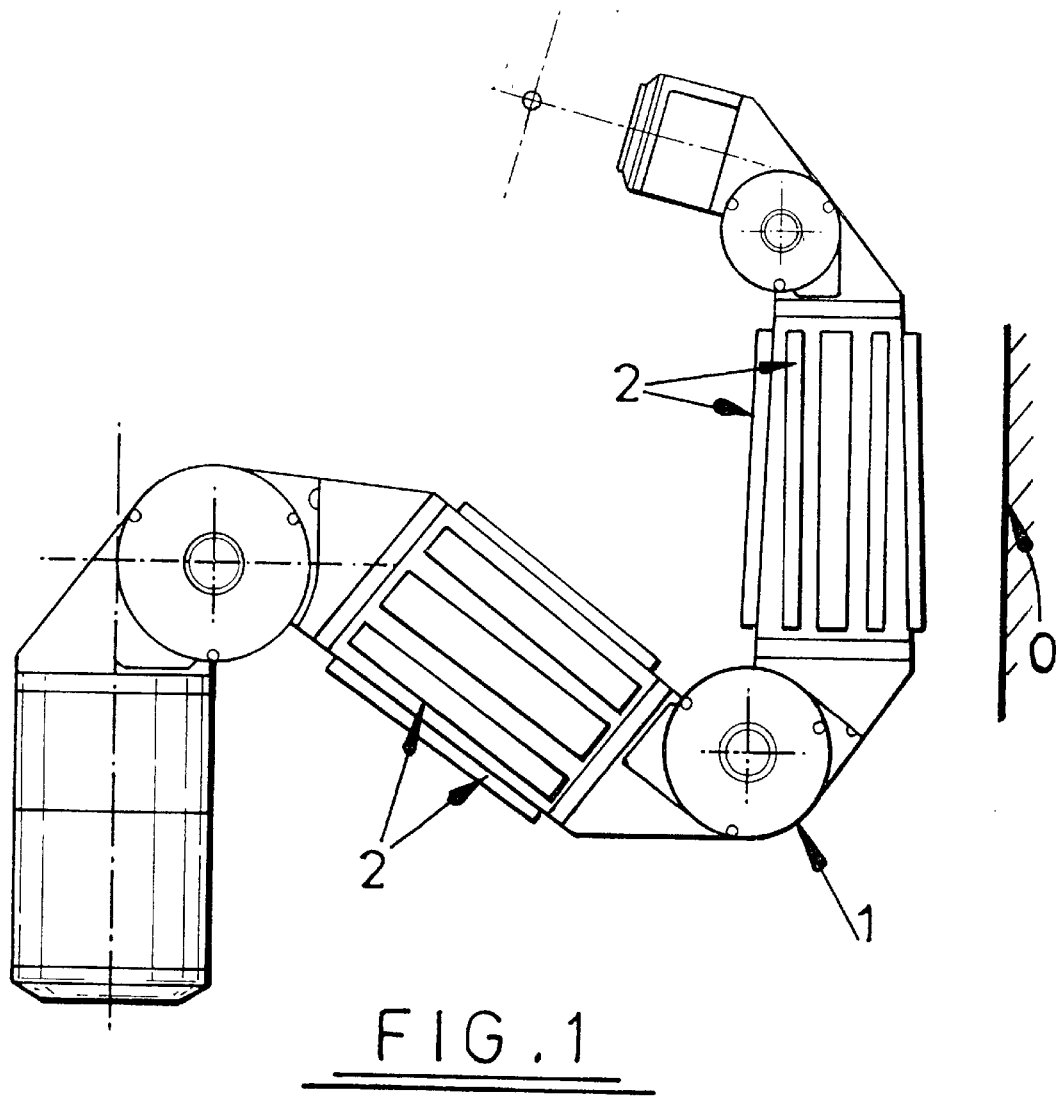
FIG. 1 is an illustration of a robot manipulator incorporating a number of sensor elements of a range sensing system according to the present invention.
Figure 2:
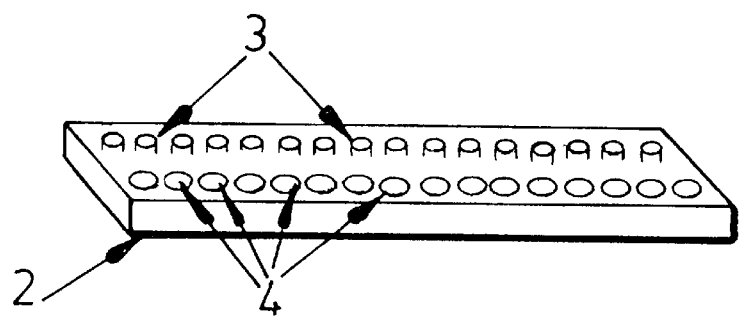
FIG. 2 is an illustrations of a single sensor element of FIG. 1.

The illustrated range sensing system is an embodiment of the present invention used as part of a collision avoidance system of a robot manipulator 1 (see FIG. 1). The sensing system comprises a number of strip-like sensor elements 2 disposed parallel to the axis of the manipulator's links. The sensor elements 2 function to detect the presence of an object O in a manner which will be described below. Referring to FIG. 2, which illustrates a single sensor element 2 in greater detail, each sensor element 2 comprises a linear array of sixteen equispaced Infra-Red light emitting diodes (IR LED's) 3 and an adjacent linear array of correspondingly spaced photo diodes (IR detectors) 4. The general direction of emission of the LED's is perpendicular to the linear array and represents the axis along which the range is measured.

Figure 3:
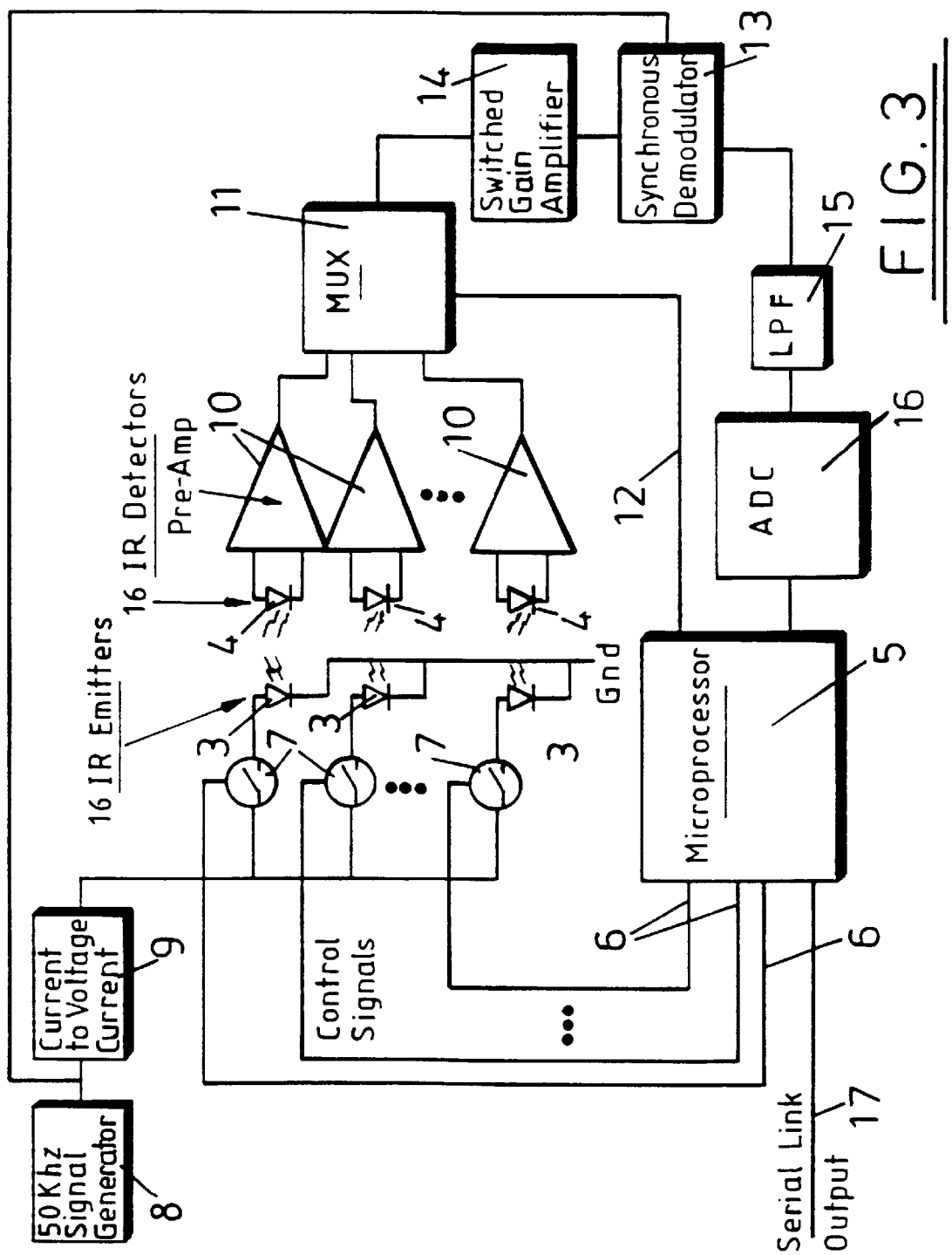
FIG. 3 is a block diagram of the range sensing system of FIG. 1.

The further components of the sensing system relating to a single sensor element 2 will now be described with reference to the block diagram of FIG. 3. It will be appreciated that the arrangement shown in FIG. 3 and described below is repeated for each sensor element of the complete system. For simplicity of description the block diagram shows in full lines only three IR LED's and photo diodes of a single sensor element instead of the full sixteen.

The system is controlled by a microprocessor 5 which supplies control signals along control lines 6 to switches 7 each of which is associated with a respective IR LED 3. The IR LED's 3 are driven by a 50 kHz (square wave) signal generator 8 via a current to voltage converter 9 and respective switches 7. The switches 7 are controlled by the microprocessor 5 to open and close sequentially so that each IR LED 3 is caused in turn to emit a pulse of 50 kHz modulated IR light.

In use, any object illuminated by the IR light emitted by each of the LED's 3 in turn will reflect some of that IR light onto one or more of the photo diodes 4. Each photo diode 4 generates a signal the voltage of which is proportional to the intensity of the detected IR light. Those signals are amplified by respective pre-amplifiers 10 before being fed to a multiplexer 11 which is controlled by signals received from the microprocessor 5 via a control line 12.

The multiplexer 11 outputs a single signal which is supplied to a synchronous demodulator 13 via a switched gain amplifier 14. The modulation of the emitted IR light and subsequent synchronous demodulation of the signal produced by the photo diodes enables the extraction of a signal dependant on the intensity of IR light reflected from the IR LED's 3 even though the background IR light (which will also be picked up by the detectors) may be of a much greater intensity than the light emitted by the LED's 3. This signal is then sent to an analogue to digital converter 16 via a low pass filter 15.

The switched gain amplifier 14 is switchable between four different values and is included to take account of the relatively large difference in the detected intensity of the IR light reflected from, for example, a large, relatively close range white object as compared with a small, relatively long range dark object (the difference might easily be a factor of 1000). This ensures that the signal sent to the analogue to digital converter has an appropriate voltage range for its operation.

From the analogue to digital converter a digital signal carrying data representative of the intensity of the IR light reflected from each of the LED's 3 (in turn) by the object and detected by each of the photo diodes, is supplied to the microprocessor. This data is processed in the microprocessor by a software implemented neural network (which is describe in more detail below) to produce object range information which is output from the microprocessor via a serial line 17.

The output range information is sent to a remote processor (not shown) which controls operation of each sensor element's microprocessor (via the serial line 17), coordinates range information received from each sensor, and operates a collision avoidance procedure in accordance with the received object range information.

Figure 4:
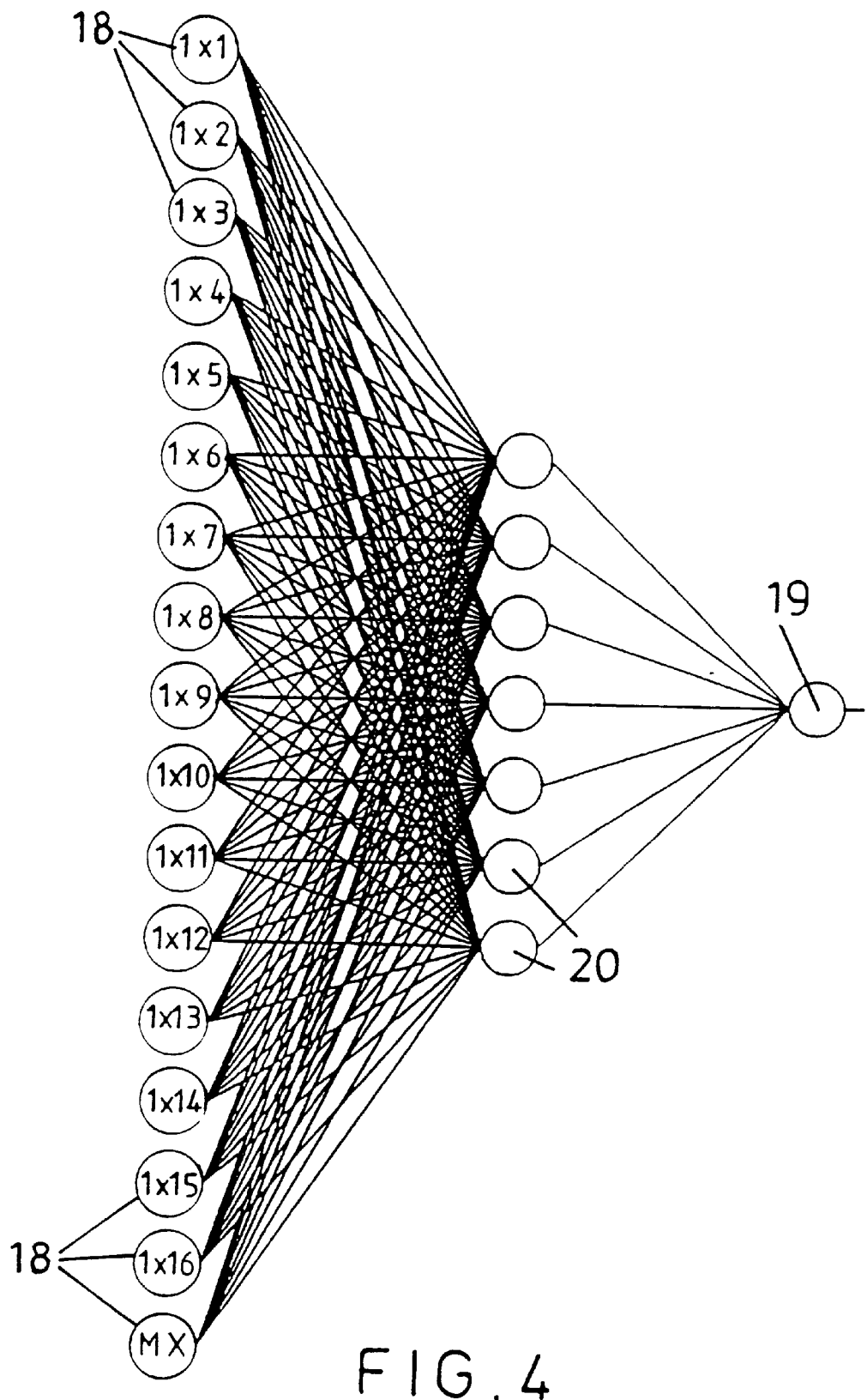
FIG. 4 is a schematic illustration of the architecture of a neural network incorporated in the range sensing system of FIG. 1.

The neural network will now be described. There are sixteen independent neural networks for each sensor element, one processing the signals from each of the photo diodes 4. FIG. 4 is a schematic illustration of the architecture of one of the neural networks. Each network has seventeen input nodes 18; sixteen for receiving signals representative of the detected IR intensities at each of the sixteen photo diodes, and an additional magnitude scaling input which is scaled so that the largest received signal has a magnitude of 1.

Each neural network has two layers in addition to the seventeen node input layer; a single node output layer 19 and a hidden layer containing seven nodes 20. The network has full connection between each of its three layers and sigmoid transfer functions are used in each of the nodes.

As with all neural networks, before being put into operation the network must first be trained. Initial off-line training may be accomplished by first presenting a particular sensor element (or array of sensor elements) with a variety of target objects at different ranges, positions and orientations to accumulate the necessary training data (this procedure may be automated using a robot manipulator). Data representative of the reaction of any given sensor element 2 to any given object is transferred to a training computer (not shown), via the respective serial line, where it is stored together with details of the target, such as range, size, orientation, albedo etc.

Once sufficient training data has been accumulated by the training computer, a neural network software package is used to determine the correct weighting for the network using the back propagation of errors technique (see for example "Parallel Distributed Processing, Volume 1: Foundations", Rumelhart, D. E. and McClelland, J. L., The MIT Press, 1988.). This procedure determines the appropriate weights by using any error in an output value corresponding to a given set of input data to alter the weights such that the error is reduced. Each weight is adjusted by an amount that is dependant on its contribution to the output value. This procedure is applied iteratively until the error achieved across the entire training data set is acceptable.

Using this method to train the sixteen networks of a single sensor element to determine the range of a variety of articles between a minimum range of 25 mm and a maximum range of 525 mm, with approximately 20% accuracy, may take several hours using a high performance workstation. However, this is a once only procedure and having been properly trained the sixteen networks can rapidly process input data, real-time operating processing taking of the order of only 20 ms.

For objects close to the sensor the collected data and subsequent processing yields information on both the range and lateral position of the object relative to the sensing element.

It will be appreciated that the details, and application, of the above described embodiment of the invention could be varied. For instance any number of sensor elements 2, from one upwards, could be incorporated in the system, and each sensor element requires only either a plurality of emitters and one detector or vice versa. In practice, use of sixteen emitters and sixteen detectors yield more data than is necessary to determine the range but the excess data serves to increase accuracy and reduce the overall effect of noise in the system.

Similarly the configuration of the emitter(s)/detector(s) could vary considerable and need not be in two straight and parallel rows.

In addition, details of the sensor element control and data processing could be varied. For instance, rather than each sensor element having an associated microprocessor, the data from all the sensor elements could be processed by a single processor. Similarly the neural network architecture could be varied and the network could be implemented in hardware instead of software, or a combination of the two.

Moreover, as an alternative to the use of a neural network analytical computation means could be used to process the data gathered by the sensors. However, use of a neural network is advantageous since it would be difficult to produce an analytical solution if the object geometry is likely to be complex and if individual object characteristics might differ widely. For instance, it would be difficult to produce an analytical model of an object having a combination of different planar and curved surfaces. In addition, the performance and behaviour of the particular IR emitters and detectors used would have to be characterised accurately, and these characteristics would be different for each sensor unless expensive matched devices are used.

In contrast, a neural network can readily cope with large numbers of variables and can learn the characteristics of the emitters and detectors used. If the emitter(s) and/or detector(s) of different sensors have different characteristics, their performance can be measured and the weights of the neural network inputs adjusted accordingly, thereby obviating the need to repeat the training operation for each new sensor.

I claim:

1. An object sensing system comprising at least one array of emitters arranged with overlapping fields of illumination such that each illuminates at least part of a space within which objects are to be sensed, at least one detector positioned to detect the intensity of radiation reflected from each object to be sensed, means for energising the emitters in a sequence such that the space is illuminated by each emitter in turn, and means for correlating the energisation of each of the emitters with an intensity dependant output of the or each detector to sense the range of an object from the emitters within the space.

2. An object sensing system according to claim 1, comprising more than one array of emitters, each emitter array illuminating a different part of said space and having at least one detector associated therewith.

3. An object sensing system according to claim 1 or claim 2, comprising an array of detectors associated with the or each array of emitters.

4. An object sensing system according to claim 1, further comprising a neural network for processing the correlated data from each emitter and the or each detector to derive object range information.

5. An object sensing system according to claim 4, wherein the neural network is implemented in software by a microprocessor.

6. An object sensing system according to claim 4, wherein the neural network has separate input nodes for receiving data representative of the or each detector output for detected light reflected from each emitter.

7. An object sensing system according to claim 6 wherein the neural network has an additional input node for receiving a scaling value so that the maximum of the input values is equated to 1.

8. An object sensing system according to claim 1, wherein each emitter is an infra red light emitter, and the or each detector is an infra red light detector.

9. An object sensing system according to claim 1, comprising means for modulating the radiation emitted by each emitter and means for demodulating the output of the or each detector so that information relating to the detected reflected emitted radiation can be differentiated from that relating to the detected background radiation.

10. An object sensing system according to claim 1, comprising means for varying the system's sensitivity by varying the gain of an amplifier through which the or each detector output is passed.

11. An object sensing system comprising at least one emitter which illuminates a space within which objects are to be sensed, at least one array of detectors each positioned to detect the intensity of radiation reflected from the objects to be sensed, and means for correlating the output of the or each emitter with an intensity dependant output of each detector to sense the range of an object from the or each emitter within the space.

12. An object sensing system according to claim 11, comprising more than one array of detectors each having at least one emitter associated therewith.

13. An object sensing system according to claim 11 or claim 12, comprising an array of emitters associated with the or each array of detectors.

14. An object sensing system according to claim 11, further comprising a neural network for processing the correlated data from the or each emitter and each detector to derive object range information.

15. An object sensing system according to claim 14 wherein the neural network has separate input nodes for receiving data representative of each detector output for detected light reflected from the or each emitter.

16. An object sensing system according to claim 15, wherein the neural network has an additional input node for receiving a scaling value so that the maximum of the input values is equated to 1.

17. An object sensing system according to claim 11, wherein the or each emitter is an infra red light emitter, and each detector is an infra red light detector.

18. An object sensing system according to claim 11, comprising means for modulating the radiation emitted by the or each emitter and means for demodulating the output of each detector so that information relating to the detected reflected emitted radiation can be differentiated from that relating to the detected background radiation.

19. An object sensing system according to claim 11, comprising means for varying the system's sensitivity by varying the gain of an amplifier through which each detector output is passed.

20. An object sensing system according to claim 1 or claim 11, comprising at least one array of said emitters and at least one array of said detectors, wherein the or each array of emitters and/or detectors is linear.

* * * * *